G. B. MILLERD.
Making Rubber Fabrics.
No. 16,601.
Patented Feb. 10, 1857.
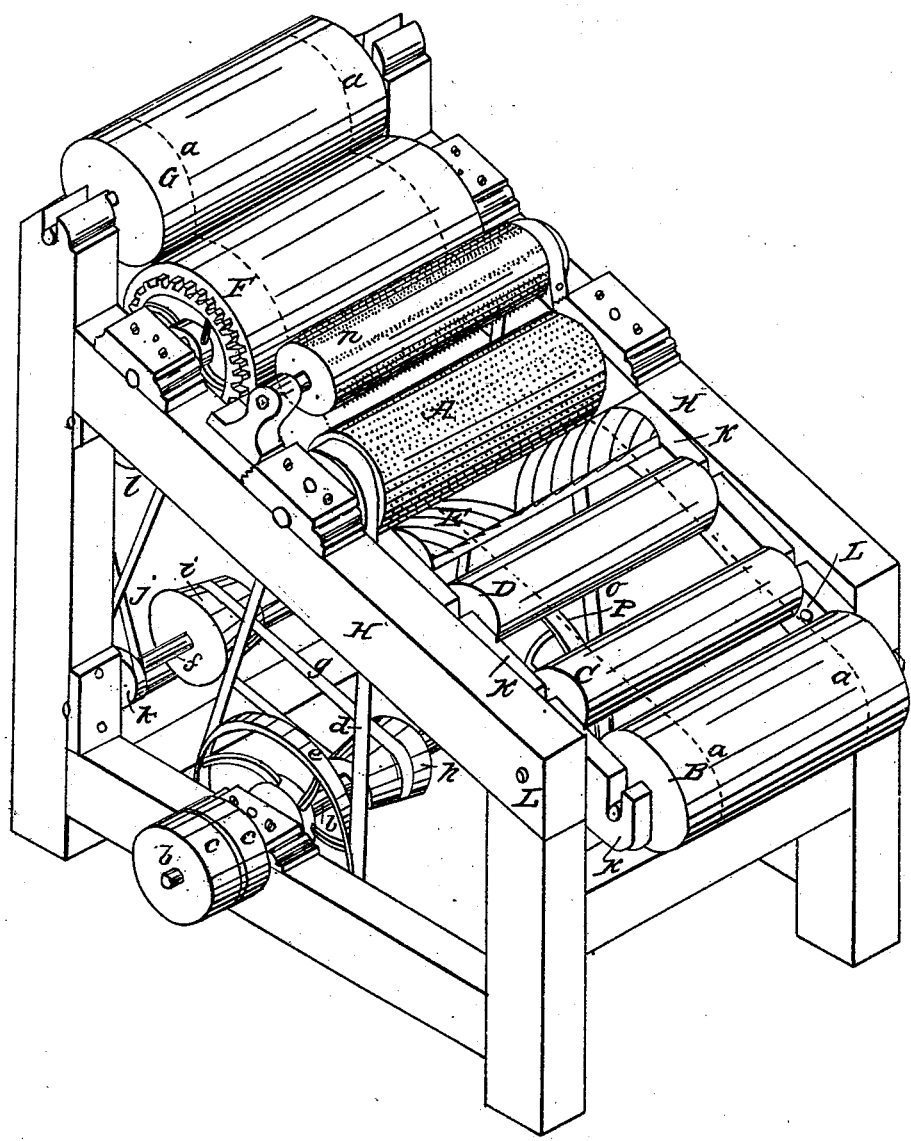

UNITED STATES PATENT OFFICE.

G. B. MILLERD, OF COLCHESTER, CONNECTICUT.

PREPARING INDIA-RUBBER CLOTH.

Specification of Letters Patent No. 16,601, dated February 10, 1857.

*To all whom it may concern:*

Be it known that I, GULIELMUS B. MILLERD, of Colchester, in New London county and State of Connecticut, have invented a new and improved mode of preparing the vulcanized sheets of caoutchouc or india-rubber and connecting them with cloth and other fabrics to produce elastic or unelastic goods; and I do hereby declare that the following is a full, clear, and exact description thereof, reference being had to the accompanying drawings, making part of this specification.

The object of my improvement is the production of an elastic fabric by the union of an uncemented sheet of vulcanized caoutchouc between two pieces of cloth, and of producing a more perfect adhesion between the caoutchouc and the cloth or other fabric to which it is connected than could be effected by the application of cement to the surface of the caoutchouc, and thereby avoiding the deleterious effects occasioned by the decomposing action of cement, on the elasticity, strength and durability of the goods.

In pursuance of this object I proceed as follows; viz., I first prepare the sheet of caoutchouc by boiling it in caustic alkali, after which it is boiled in salt pickle to destroy or neutralize the alkali that may adhere thereto; both the alkali and pickle should possess about 20° of strength as indicated by an alkalimeter; it should then be thoroughly cleansed in water; this desulfurizes the surface to some extent imparting greater adhesive properties and increases its elasticity. I then buff the surfaces of the sheet by passing it in contact with a cylinder coated with emery or other grinding substance, the mode by which I accomplish this is as follows; viz., A (see accompanying drawings which is a view in isometrical perspective of a machine for that purpose) is a buffing cylinder of from 4 to 6 inches in diameter and of a length corresponding to the greatest width of sheet to be acted on; the surface of this cylinder is covered with emery.
B is a beam or cylinder on which the vulcanized sheet $a$, $a$, is wound preparatory to being acted on. This sheet is conveyed over the rollers C, D and the spreading bar E thence under the grinding cylinder A and over the drawing cylinder F and is finally wound on the receiving beam G. The top H, H, of the frame supporting the cylinders and acting parts of the machine has an inclination or slope of 20 or 30 degrees, so that as the sheet advances from the cylinder B toward the cylinder G, it also passes upward.

$b$ is the driving shaft which receives motion by a belt on the tight and loose pulleys $e$, $c$, the grinding cylinder A is driven by the belt $d$ from the pulley $e$. An intermediate shaft $f$ is driven by the belt $g$ on the cone drums $h$, $i$; the belt $j$ conveys motion from the pulley $k$ to the stud pulley $l$, and thence by a pinion attached and revolving with the pulley $l$, and acting on the gear $m$, motion is communicated to the drawing cylinder which by the adhesion of the vulcanized sheet (the receiving beam resting thereon), draws the sheet forward through the machine; the sheet in its progress passes under and in contact with the surface of the grinding or buffing cylinder which revolves in a direction contrary to that of the sheet, and with a velocity of about 800 or 1,000 revolutions per minute while the sheet passes with a slow motion which may be varied by varying the position of the belt $g$ on the cone drums $h$, $i$, which may be done with a hand guide; the intermediate shaft $f$, may be dispensed with if preferred and a belt may communicate directly from $h$ to $l$.

$n$ is a brush cylinder which is operated by a belt, $o$, from a pulley P, on the driving shaft, this brush cylinder revolves in the same direction as the grinding cylinder, and is designed to remove loose fragments and dust from the surface of the sheet. The beam or cylinder B and rollers C, D, are supported in an independent frame K, K, E, the spreading bar E forming a connection between the two branches K, K, and this is suspended to the principal frame at the joints L, in such manner that the spreading bar E, may be raised or lowered to give greater or less surface of the sheet in contact with the grinding cylinder; this may either be adjusted by screws for that purpose or by any other proper mode of action. The spreading beam is grooved on its upper surface diagonally in such manner that the sheet in its passage toward the grinding cylinder shall have a tendency to draw, by following the direction of the grooves from the center toward the sides of the machine by which means it is kept extended, so that no folds or wrinkles shall come in contact with the cylinder.

The buffing cylinder instead of emery may be covered with sand paper firmly secured thereon or with files rasps, or any thing that will produce a rough or grinding surface to destroy or change the glazed surface of the caoutchouc.

The sheet thus acted upon has a soft velvety appearance like fawn skin, and is rendered more pliable and retains its elasticity and strength.

The cloth to be attached to the prepared sheet of caoutchouc, is thinly coated on the tangent side with caoutchouc dissolved with some solvent, and the solvent being subsequently thoroughly evaporated, it is brought in contact with the caoutchouc and subjected to strong pressure by passing between heavy rollers or otherwise, and the union is perfected so that the surfaces adhere firmly and permanently without the use of cement on the cauotchouc.

When the design is to make an extensible and elastic fabric by the combination of the caoutchouc with the cloth, the vulcanized sheet should be drawn out or extended in any desired degree, and in this condition applied between two sheets of cloth; and in this state passed between the rollers to press the surfaces in actual contact and the union is perfect. The vulcanized sheet may if desired be extended to three or four times is original length, and in this condition the fabric would contract to the same extent when left free and for this purpose cloth of a thin open texture is best, for if close woven it would not allow sufficient contraction to satisfy the elastic tendency of the coautchouc without wrinkling and contortion of its surface.

When the prepared sheet of caoutchouc is in its free state connected with cloth, the fabric in such case possesses no more elasticity than that due to the extensibility of the cloth. And in whatever condition the caoutchouc exists when combined with the cloth, it will cause the whole to be contracted to its natural free condition or dimensions when left free, and may again be drawn out, or extended to the natural dimensions of the cloth in a free state and is perfectly elastic between these limits.

After the fabric is thus formed, it should be subjected to a moderate degree of heat; say 150 degrees Fahrenheit, to evaporate perfectly any exhalations and destroy any offensive smell.

The first process above described, of the preparation of the vulcanized caoutchouc by boiling in alkali, &c., may be dispensed with if preferred; but in such case the sheet will require about double the amount of buffing to prepare its surface for adhesion to the cloth. I usually pass the sheet once or twice through the buffing machine when previously prepared by the alkaline process and three or four times when not thus prepared.

I am aware that unvulcanized caoutchouc has been prepared by passing it in sheets between engraved or roughened rollers, and by passing it between two pieces of cloth with rough exterior through the rollers in such state, to produce roughness or minute cavities on its surface, so that when subsequently vulcanized, by the application of cement which may be retained in these cavities and made to act as a solvent uniformly over its surface it becomes in a manner cemented with the coating which is first applied to the cloth. But the caoutchouc prepared in this manner is not firmly combined with the cloth and the cement acting as a solvent, soon destroys the strength and elasticity of the caoutchouc, and the cloth cleaves therefrom, especially when put to service. But by the mode of preparation adopted by me, in buffing the vulcanized sheet the glazing of the surface is destroyed which becomes as if coated with indefinitely fine fibers of fine unimpaired caoutchouc, like the finest velvet or in texture like finely prepared fawn skin and when brought in compressed contact with cloth thinly coated with caoutchouc it adheres thereto firmly and permanently without cement.

When the unvulcanized sheet of caoutchouc is passed as referred to above between rollers with roughened surfaces, it produces uneven surfaces in the sheet; yet the minute cavities and cells which may exist in the surface there is the same glazed or glassy surface as on its plane surfaces when passed between smooth rollers; and no proper adhesion can take place in this state between the caoutchouc and the cloth to which it may be attached, except through the agency of cement which acts as a solvent on this surface; but my improved mode of dressing the surface prepares it for secure and permanent adhesion, without impairing its qualities by using a solvent on the caoutchouc.

I do not claim the process described of boiling the caoutchouc in alkali, to desulfurize its surface; nor the buffing or grinding its surface to produce roughness thereon. Neither do I claim the attachment of a sheet of caoutchouc to cloth, either in an extended state to produce an elastic fabric, or in a free state to produce an inelastic fabric, where the union is effected by the application of cement to the caoutchouc, or by subsequent vulcanization. But

What I claim as my invention and for which I solicit Letters Patent is—

The application of a sheet of vulcanized caoutchouc, previously prepared by buffing its surface or surfaces, substantially as described, to a sheet of cloth, or between two sheets of cloth previously prepared by being thinly coated with an unvulcanizable solution of caoutchouc on the tangent side, or sides; the sheet of caoutchouc being applied in an extended state to produce an extensible and elastic, or in a free state to produce an inelastic fabric; by simple pressure, and without the use of cement or subsequent vulcanization.

GULIELMUS B. MILLERD.

Witnesses:
SELEG ROSE,
NATHAN SCHOLFIELD.